United States Patent [19]
Kapoor

[11] Patent Number: 5,818,852
[45] Date of Patent: Oct. 6, 1998

[54] PACKET DATA COMMUNICATION METHOD AND SYSTEM

[76] Inventor: Vijay Kapoor, 408 E. La Marche Ave., Phoenix, Ariz. 85022

[21] Appl. No.: 752,512

[22] Filed: Nov. 20, 1996

[51] Int. Cl.⁶ .................................................. H04L 1/18
[52] U.S. Cl. .................................................. 371/33
[58] Field of Search .................................. 371/32, 33, 35

[56] References Cited

U.S. PATENT DOCUMENTS

| | | | |
|---|---|---|---|
| 3,598,914 | 8/1971 | Synnott, III ............................... | 178/58 |
| 4,697,281 | 9/1987 | O'Sullivan ................................ | 379/59 |
| 5,084,877 | 1/1992 | Netravali et al. ......................... | 371/32 |
| 5,440,545 | 8/1995 | Buchholz et al. ........................ | 370/60 |
| 5,487,068 | 1/1996 | Smolinske et al. ...................... | 370/94.1 |
| 5,570,367 | 10/1996 | Ayanoglu et al. ....................... | 370/94.1 |
| 5,677,918 | 10/1997 | Tran et al. ................................ | 371/32 |

*Primary Examiner*—Stephen M. Baker
*Attorney, Agent, or Firm*—Harold C. McGurk

[57] ABSTRACT

A data transmission system (5) transmits data between a transmitter (10) and a receiver (20). Each data packet frame (130) is made up of three parts: a header (131), a packet identifier number (132), and subframes of data (133). Error codes are generated corresponding to each subframe of data (133). The transmitter (10) will then check the error code to determine which subframes of data (133) contain an error. If there are errors in the data packet (130), then the receiver (20) stores the error-free subframes in memory and does not send an acknowledgment packet (140). The master (10) will retransmit the same data packet until it receives an acknowledgment packet (140).

14 Claims, 2 Drawing Sheets

PACKET DATA COMMUNICATION METHOD AND SYSTEM

FIELD OF THE INVENTION

This invention pertains generally to communications, and more particularly, to packetized data transfers.

BACKGROUND OF THE INVENTION

Transmission of data packets mostly results in successful arrival of intact packets at a receiving system. However, as wireless communication becomes more pervasive, congestion and interference becomes more of a problem. Frequently, data packets are jumbled during propagation and reception may be difficult or impossible. When data packets do not arrive intact as transmitted, they must be retransmitted and these retransmissions impact the bandwidth of the communication channel. Certain transmission links become particularly susceptible to higher bit error rates such as where it is necessary to utilize minimum power to transmit signals. This is a particular problem in cellular satellite data communications where satellite transmission power must be minimized. Accordingly, what is needed is a system and method for reducing the number of errors in a communication system that has high bit error rates.

DETAILED DESCRIPTION OF THE PREFERRED EMBODIMENT

Figure 1:
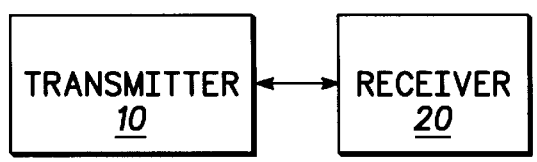
FIG. 1 shows a block diagram of a communication system according to a preferred embodiment of the invention.

The invention provides a method and system for improving receipt of error-free data packets. FIG. 1 illustrates a block diagram of communication system 5 according to a preferred embodiment of the invention. In FIG. 1, communications between transmitter 10 and receiver 20 follow a traditional ping-pong approach with transmitter 10 transmitting data packets to receiver 20, and receiver 20 responding to transmitter 10 with an acknowledgment packet 140. Such communication continues with data packets being transmitted from transmitter 10 and acknowledgment packets of correct data being sent by receiver 20. Transmitter 10 and receiver 20 may be telephones, satellite telephones, satellites, base stations, computers, facsimile devices and any other communication device.

Figure 2:
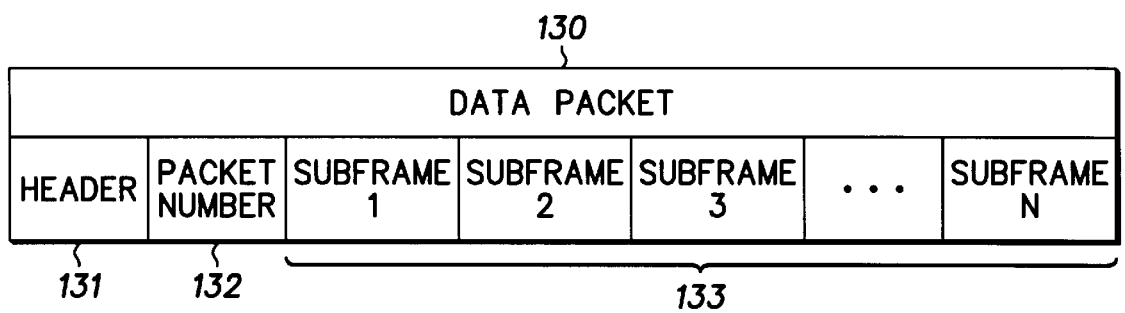
FIG. 2 illustrates a format of a data packet frame according to a preferred embodiment of the invention.

FIG. 2 illustrates a format of data packet frame 130 according to a preferred embodiment of the invention. As shown in FIG. 2, data packet frame 130 conveys digitized data from transmitter 10 to receiver 20 and comprises header 131, packet number 132 and a plurality of subframes of data 133. Header 131 may carry routing or synchronizing data depending on the specific configuration of the communication system. Packet number 132 uniquely identifies an individual data packet frame 130 for acknowledgment purposes and may serve other purposes such as enabling receiver 20 to reassemble received data packets in sequential order. Each of the multiple subframes of data 133 contains data. A checksum error code is generated for each of the plurality of subframes 133 and for the entire data packet frame 130. The checksum error code may be put at the end of the segment or interspersed within the segment. It does not matter where the checksum is put. What is important that each segment and collectively all segements of a frame are verified by an encoding process to be received correctly. There may be other fields that may be added to data packet frame 130. Moreover, the order of the fields is not important to this invention.

Figure 3:
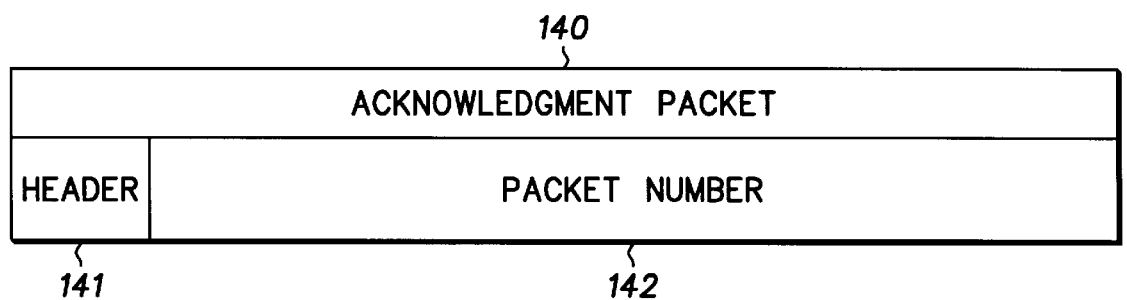
FIG. 3 illustrates a format of an acknowledgment packet according to a preferred embodiment of the invention.

FIG. 3 illustrates a format of an acknowledgment packet 140 according to a preferred embodiment of the invention. Acknowledgment packet 140 is transmitted from receiver 20 to transmitter 10 and comprises header 141 and at least one packet number 142. Header 141 carries synchronization or routing data that is dependent upon the configuration of the communication system. Packet number 142 identifies the packet for which an acknowledgment is being sent. More fields may be added to acknowledgment packet 140, and the order of the fields is not important to this invention.

Figure 4:
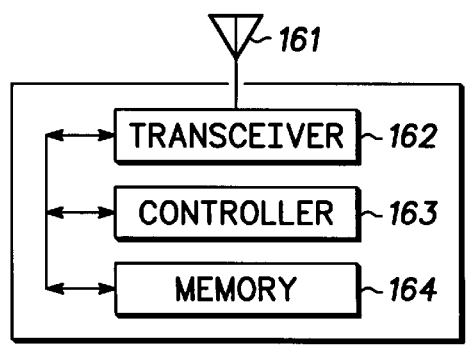
FIG. 4 shows a block diagram of a transmitter and/or receiver according to a preferred embodiment of the invention.

FIG. 4 shows a block diagram of transmitter 10 and/or receiver 20 according to a preferred embodiment of the invention. Discussion of FIG. 4 will first discuss the components of FIG. 4 in relation to transmitter 10, followed by a discussion of receiver 20. Transmitter 10 comprises antenna 161, transceiver 162, controller 163, and memory 164. Transceiver 162 of transmitter 10 transmits and retransmits data packets to receiver 20 and receives and evaluates an acknowledgment confirming the successful arrival of data packets. Controller 163 executes program controls to perform steps such as assembling data packets for transmission by transceiver 162 and for generating error detecting codes such as a checksum code over subframes and frames of data packets, for example. Controller 163 also receives and processes acknowledgments from transceiver 162 and manages the selection of packets for transmission. Memory 164 facilitates program execution for the described method and may also be shared with other applications being performed within transmitter 10 such as data packet buffering or storage.

Transceiver 162 of receiver 20 monitors data packets from transmitter 10 and transmits an acknowledgment confirming the successful arrival of a data packet and successful assembly of a data packet as described below. Controller 163 is operatively coupled to transceiver 162 for receiving data packets from transceiver 162, and for assembling an acknowledgment for delivery to transceiver 162. Memory 164 facilitates program execution for the described method and may also be shared with other applications being performed within receiver 20 such as data packet buffering or storage such as for storing subframes which have been received without error.

Figure 5:
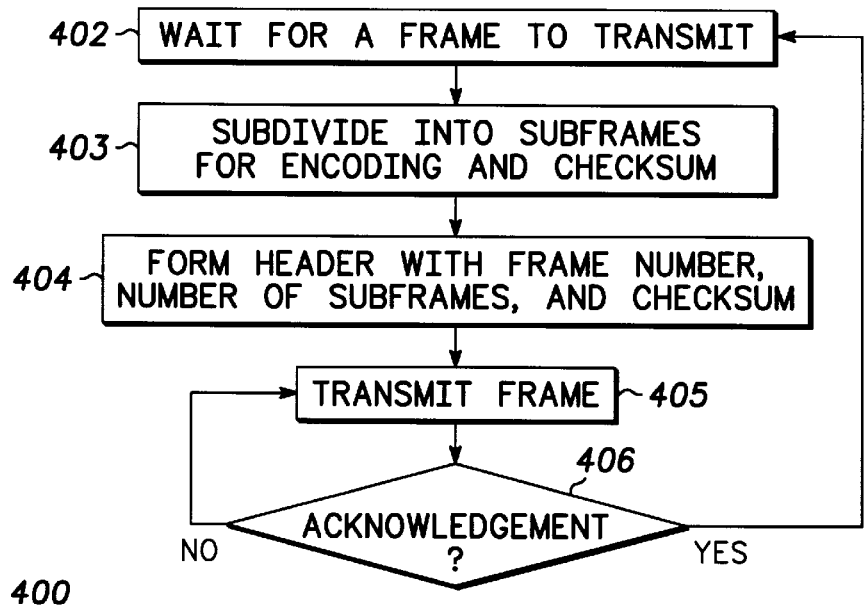
FIG. 5 shows a flow chart of a method for a transmitting data packets according to a preferred embodiment of the invention.

FIG. 5 shows a flowchart of method 400 for transmitting frames of data packets according to a preferred embodiment of the invention. Method 400 may be executed by transmitter 10. Method 400 starts in step 402 by waiting for a frame of data which is received internally. The frames of data are stored in memory for transmission. After a frame of data is received in step 402, method 400 subdivides in step 403 the frame of data into subframes.

The frame in the illustrative embodiment is broken into subframes of forty bits in length. In the preferred embodiment, each frame includes a plurality of subframes which preferably are ten subframes. However, as one skilled in the art would be aware, the size of each subframe as well as the number of subframes in a frame of packetized data may be varied. An error detecting code, for example, a checksum, is calculated over each subframe. The error detecting code may be put at the end of the segment or interspersed within the segment. It does not matter where the error detecting code is put. What is important that each segment and collectively all segments of a frame are verified by an encoding process to be received correctly. In addition, the subframe data may be encoded for transmission.

Method 400 generates in step 404 a header for the frame by generating a packet number to identify the frame. The header may also include the number of subframes in the frame. Step 404 also records in memory 164 of the transmitter 10 the data packet number and any other housekeeping matters for retrieval. Recording of data packet numbers provides a log of the data packets. In step 404, an error code which, in the preferred embodiment is a checksum, determined solely for the header and included in the header.

Method 400 (via transmitter 10) transmits in step 405 the frame of information which includes the header and subframes. After transmitting the frame, method 400 waits in step 406 for a predetermined period of time for an acknowledgment. Controller 163, for example, includes a counter which provides this timing function. In the event that an acknowledgment is not received before expiration of the time period, step 405 is again repeated by retransmitting the data packet frame. Only after an acknowledgment signal is received will the transceiver again return to step 402 to wait to receive internally another data packet frame before beginning the steps for transmitting the frame.

Figure 6:
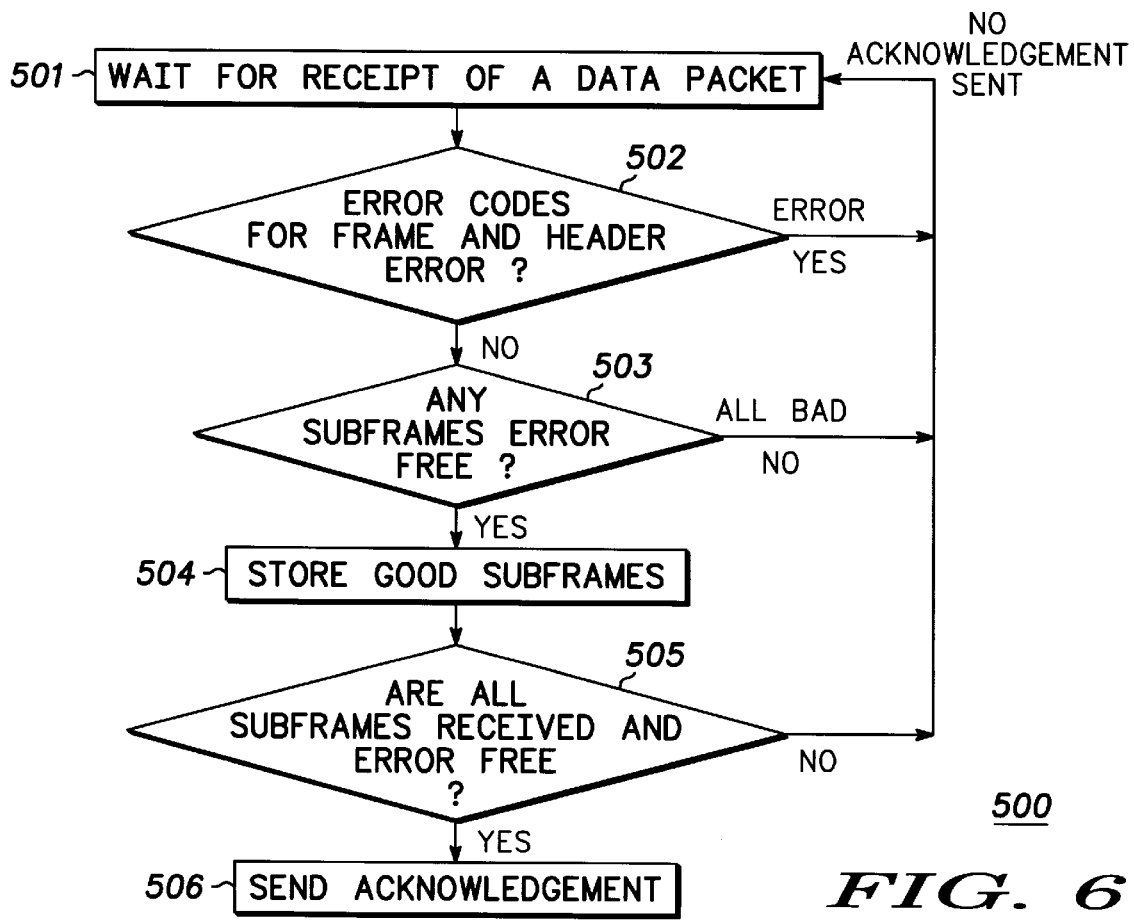
FIG. 6 shows a flow chart of a method for receiving data packets according to a preferred embodiment of the invention.

FIG. 6 shows a flowchart of method 500 for receiving data packets according to a preferred embodiment of the invention. The steps shown in FIG. 6 are performed by receiver 20. Method 500 begins in step 501 by waiting for receipt of a data packet. Next in step 502, method 500 checks the error codes of both the frame and header by calculating a checksum, for example, over the frame and comparing it to the checksum code which has been transmitted along with the frame. If an error is detected in step 502, method 500 returns to step 501 and no acknowledgment signal is sent to transmitter 10. The result is that transmitter 10 will retransmit the frame of information to receiver 20 after expiration of its timer.

If method 500 determines that the error code for the frame and header is correct in step 502, method 500 checks in step 503 for errors in each of the subframes. The error codes for the subframes, again, are checksums and the checksum is calculated over each subframe and compared with the checksum code transmitted as part of the data packet. If method 500 determines that any subframe checksums indicate that some sub-frames are error-free in step 503, method 500 returns to step 501 and does not provide an acknowledgment. Whenever method 500 returns to step 501, it awaits retransmission of a new frame of packet data.

If, however, method determines in step 503 that at least some of the subframes are error-free, then method 500 stores only the good or error-free subframes in memory 164 of receiver 20. Method 500 next checks in step 505 whether all the subframes stored in memory are designated as belonging to a particular frame number. If not, method 500 returns to step 501 and does not send an acknowledgment signal. If, however, method 500 determines in step 505 that all the subframes for the frame stored in memory 164 have been received and do not contain errors, then an error-free frame has been assembled in memory 164. Step 506 is performed in which an acknowledgment signal is sent to the transmitter 10.

It should be noted that the transmitter 10 includes in its controller 163 an acknowledgment timer and that timer is triggered upon transmitting a data packet. During the time determined by the acknowledgment timer, an acknowledgment signal must be returned to the transmitter 10 or the data packet will be resent.

Thus, in accordance with the principles of the invention and the illustrative embodiment as described, packetized data is sent in subframes and the data packet is resent until each subframe for a frame has been correctly received at least once. Further in accordance with the principles of the invention, a frame is reconstructed from subframes which do not contain errors. Thus, the same frame may be sent multiple times before an acknowledgment signal is provided.

In addition, although the foregoing steps were described with respect to a single data packet or frame being sent, it will be understood by those skilled in the art that multiple frames may be sent at a time and that acknowledgments may be provided for each of the frames such that only the frames containing errors are resent and not the entirety of all the multiple frames which were originally sent.

It will be understood by those skilled in the art that various variations and modifications may be made to the method and apparatus of the illustrative embodiment without departing from the spirit or scope of the invention. Accordingly, the invention is intended to embrace all such alterations, modifications, equivalents and variations as fall within the spirit and scope of the appended claims.

What is claimed is:

1. A method for transmitting a data frame, the method comprising the steps of:
   a) dividing the data frame into subframes;
   b) generating error codes, each of the error codes corresponding to one subframe of the subframes;
   c) forming the data frame from the subframes and the error codes;
   d) transmitting the data frame from a first system;
   e) receiving at a second system, the data frame;
   f) determining from the plurality of error codes which subframes of the received data frame are error-free;
   g) storing the subframes that are error-free;
   h) repeating steps d) through f) until all subframes of the data frame are received error-free; and
   i) transmitting acknowledgment information from the second system to the first system after all the subframes have been received error-free.

2. A method in accordance with claim 1 comprising the additional steps of:
   generating at the first system a header for the data frame, the header including packet identifying information and a header error code; and
   utilizing the header error code in the received data frame to determine whether the header has been received error-free.

3. In a communication system, a method for transferring a frame of data, comprising the steps of:
   forming a data packet from the frame of data by arranging the frame of data into a plurality of subframes and generating a plurality of error codes each corresponding to one of the plurality of subframes;

transmitting the data packet;

receiving the data packet;

utilizing the plurality of error codes to determine which subframes, if any, of the plurality of subframes have been received error-free; and causing the data packet to be retransmitted if less than all subframes of the plurality of subframes have not previously been received error-free.

4. The method of claim 3, further comprising the step of:

encoding the data packet.

5. The method of claim 3, wherein the step of forming a data packet includes the step of:

including in the data packet identifying information to identify the data packet.

6. The method of claim 5, further comprising the step of:

generating acknowledgment information after all subframes of the plurality of subframes have been received error-free.

7. The method of claim 6, wherein the step of generating an acknowledgment information includes the step of:

extracting the identifying information from the data packet; and incorporating the identifying information in the acknowledgment information.

8. A system in accordance with claim 7, wherein:

the first controller calculates a third error code over the data packet; and the second controller utilizes the third error code to determine if the received data packet has been received error-free.

9. A communication system comprising:

a first system, comprising:
  a first transceiver module;
  a first memory;
  a first controller, the first controller coupled to the first system module and the first memory;
  the first controller receiving a data frame and assembling a data packet from the data frame by forming a plurality of subframes, and generating a plurality of first error codes, each of the first error codes being calculated over a corresponding subframe, the first controller storing the data packet in the memory, and the first controller being operational to cause the first system module to transmit the data packet; and a second system, comprising:
  a second transceiver module;
  a second memory;
  a second controller, the second controller coupled to the second memory and to the second module;
  the second controller operating on a data packet received by the second controller to identify subframes which are error-free and storing the error-free subframes in the second memory, and causing the second system to generate an acknowledgment data packet only after all subframes of the plurality of subframes have been received error-free.

10. A communication system in accordance with claim 9, wherein:

the data packet includes a header portion;

the header portion includes identification information and a second error code, the second error code being calculated by the first controller over the header; and the second controller utilizing the second error code in the received data packet to determine whether the header has been received error-free and inhibiting the second system from generating the acknowledgment data packet in the event that the header is not error-free.

11. A communication system in accordance with claim 10, further comprising:

a communication link coupling the first system to the second system.

12. A communication system in accordance with claim 10, wherein the communication link is a radio frequency link.

13. A communication system in accordance with claim 10, wherein:

the first controller includes a means for retransmitting the data packet unless the acknowledgment data packet is received within a predetermined time period.

14. A system in accordance with claim 9, wherein:

the first controller calculates a third error code over the data packet; and the second controller utilizes the third error code to determine if the received data packet has been received error-free.

* * * * *